UNITED STATES PATENT OFFICE.

CHARLES STAROBINETZ, OF JACKSONVILLE, FLORIDA, ASSIGNOR OF ONE-HALF TO BARKING CHEMICALS COMPANY, LIMITED, OF LONDON, ENGLAND.

SULFUR DYE.

1,318,022.     Specification of Letters Patent.     Patented Oct. 7, 1919.

No Drawing.     Application filed August 8, 1918. Serial No. 248,875.

*To all whom it may concern:*

Be it known that I, CHARLES STAROBINETZ, a citizen of Russia, residing at Jacksonville, in the county of Duval and State of Florida, have invented certain new and useful Improvements in Sulfur Dyes; and I do hereby declare the following to be a full, clear, and exact description of the same.

This invention relates to an improved manufacture of brown coloring matters of the class known as sulfur colors.

I have discovered that a sulfur brown dye may be made by heating together sodium sulfid, sulfur and the oily residue obtained in the process of purification of trinitrotoluol by means of alcohol. This residue consists of a mixture of various nitro derivatives of toluol.

Practical commercial operation of the invention has demonstrated that it may be best carried into effect as follows, although considerable variation in temperature, proportions and order in which additions are made, etc., is permissible, but are not recommended.

Two hundred and fifty (250) parts of sodium sulfid, concentrated, are dissolved in two hundred (200) parts of water. After all the sodium sulfid is dissolved one hundred and ten (110) parts of sulfur are added to the melt and the mixture heated until all the sulfur dissolves. One hundred and twenty-five (125) parts of the oily residue obtained in the process of purification of trinitrotoluol by means of alcohol is then added gradually with constant mixing and the temperature is brought to about 160 degrees C. The dye is then dried carefully for about twenty-four hours and finally crushed and powdered in which form it is a commercial product, ready for use in coloring fiber and cotton, for example, a fast shade of brown, from a sodium sulfid bath.

The residue referred to and the use of which is recommended, is a known product usually obtained according to present information after distilling off the alcohol from the mother liquor obtained in recrystallizing trinitrotoluol and contains various nitrated derivatives of toluol, notably di- and tri- nitrotoluenes.

What I claim is:

1. The process of making a brown sulfur dye which comprises heating with alkali metal sulfid and sulfur, the oily residue separated from trinitrotoluol, during the purification of the latter by recrystallization from alcohol, which residue contains various nitrated derivatives of toluol.

2. The herein described brown sulfur dye containing the reaction products of alkali metal sulfid, sulfur and the oily residue obtained in the purification of trinitrotoluol which residue contains various nitrated derivatives of toluol.

3. The process of making a brown sulfur dye which comprises heating with alkali metal sulfid and sulfur, the oily residue separated from trinitrotoluene, during the purification of the latter by recrystallization from alcohol, which residue contains various di- and tri- nitrotoluenes.

4. The herein described brown sulfur dye containing the reaction products of alkali metal sulfid, sulfur and the oily residue obtained in the purification of trinitrotoluene which residue contains various di- and tri- nitrotoluenes.

CHARLES STAROBINETZ.